(12) United States Patent
Wolf et al.

(10) Patent No.: US 8,925,703 B2
(45) Date of Patent: Jan. 6, 2015

(54) FRICTION COUPLING

(75) Inventors: Andreas Wolf, Tettnang (DE); Rainer Krafft, Heiligenberg (DE); Edgar Hepp, Sipplingen (DE)

(73) Assignee: Licos Trucktec GmbH, Markdorf (DE)

( * ) Notice: Subject to any disclaimer, the term of this patent is extended or adjusted under 35 U.S.C. 154(b) by 492 days.

(21) Appl. No.: 12/611,313

(22) Filed: Nov. 3, 2009

(65) Prior Publication Data

US 2010/0065396 A1    Mar. 18, 2010

Related U.S. Application Data

(63) Continuation of application No. PCT/DE2008/000768, filed on May 7, 2008.

(30) Foreign Application Priority Data

May 7, 2007 (DE) .......................... 10 2007 021 791

(51) Int. Cl.
F16D 25/0632 (2006.01)
F16D 13/30 (2006.01)

(52) U.S. Cl.
CPC .................................... F16D 13/30 (2013.01)
USPC ..... 192/66.22; 192/70; 192/85.21; 192/85.37; 192/109 R

(58) Field of Classification Search
CPC ......... F16D 13/24; F16D 13/26; F16D 13/30; F16D 25/0632
USPC .................. 192/65, 66.2, 66.22, 70.15, 85.21, 192/85.22, 70, 85.37, 109 R
See application file for complete search history.

(56) References Cited

U.S. PATENT DOCUMENTS

| 511,047 | A | * | 12/1893 | Gawron ........................... 192/35 |
| 883,732 | A | * | 4/1908 | Moore ........................ 192/70.15 |
| 2,057,761 | A | | 10/1936 | Bolton |
| 2,502,798 | A | * | 4/1950 | Nabstedt et al. ............ 192/85.21 |
| 3,463,281 | A | * | 8/1969 | Aschauer ........................ 192/57 |
| 4,763,765 | A | | 8/1988 | Black |
| 2007/0045077 | A1 | | 3/2007 | Choi |

FOREIGN PATENT DOCUMENTS

| BE | 548702 A | 11/1959 |
| DE | 146283 C | 12/1903 |
| DE | 289680 C | 1/1916 |
| DE | 322238 C | 6/1920 |
| DE | 338009 C | 6/1921 |
| DE | 1 807 838 A1 | 5/1970 |
| DE | 199 01 052 A1 | 7/2000 |
| DE | 103 03 831 A1 | 8/2004 |
| FR | 410 578 A1 | 5/1910 |
| GB | 125026 A1 | 4/1919 |
| GB | 145063 A | 4/1921 |
| GB | 856468 A1 | 12/1960 |

* cited by examiner

*Primary Examiner* — Gene Crawford
*Assistant Examiner* — Terry Chau
(74) *Attorney, Agent, or Firm* — Burr & Brown PLLC

(57) ABSTRACT

The invention proposes a friction coupling, in particular for use in motor vehicles, e.g. for controlling an air compressor, in which coupling at least two friction surfaces can be brought into frictional connection. According to the invention, two conical friction surface pairs are provided.

12 Claims, 1 Drawing Sheet

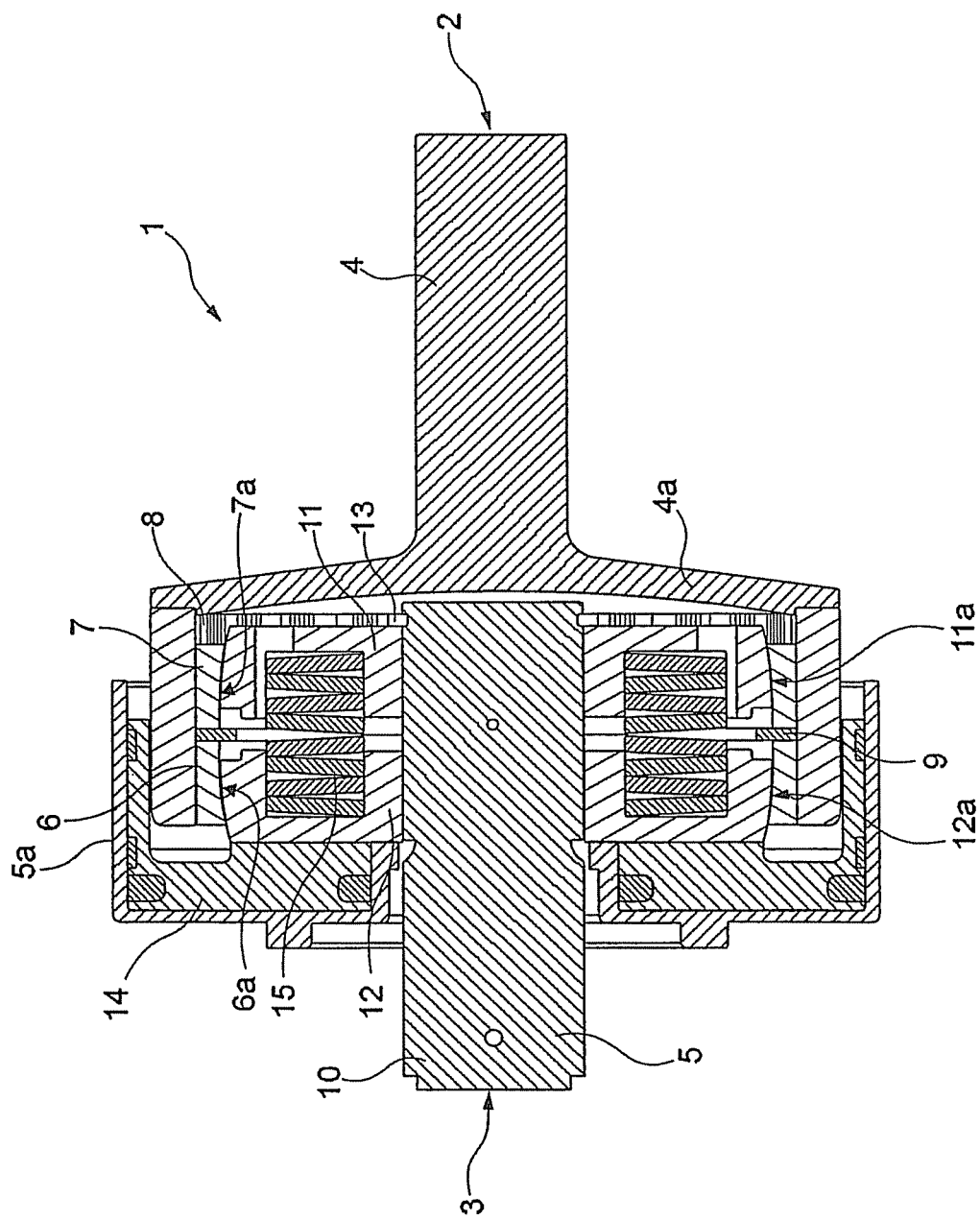

FRICTION COUPLING

CROSS REFERENCE TO RELATED APPLICATIONS

This application is a continuation of International Application No. PCT/DE2008/000768 filed May 7, 2008, which designated the United States, and claims the benefit under 35 USC §119(a)-(d) of German Application No. 10 2007 021 791.0 filed May 7, 2007, the entireties of which are incorporated herein by reference.

FIELD OF THE INVENTION

The invention relates to a friction coupling.

BACKGROUND OF THE INVENTION

Multi-surface friction clutch couplings, in which steel on steel or steel on coated plates are coupled frictionally, are generally used nowadays to switch air compressors on and off in motor vehicles. The couplings are operated either pneumatically, hydraulically or electromagnetically. In the case of such coupling systems, the maximum torque that can be transmitted depends on the overall volume of the coupling system. If the torques to be transmitted are relatively large, they require a coupling with a larger overall volume. Often, torque requirements conflict with the limited amount of installation space available in modern "engine compartments".

SUMMARY OF THE INVENTION

It is the object of the invention to provide a friction coupling of the type described at the outset which can control a higher torque but has a comparably smaller overall volume.

The invention starts from a friction coupling, in particular for use in motor vehicles, e.g. for controlling an air compressor. The friction coupling comprises at least two friction surfaces, which can be brought into frictional connection. At the heart of the invention is the fact that two conical friction surface pairs are provided. This approach is based on the insight that, for a comparable overall volume, a higher torque can be transmitted with a conical friction surface pair than with a conventional multi-surface friction clutch coupling. In the case of a conical friction surface pair, an external-cone friction surface element advantageously lies in an internal-cone friction surface element, resulting in a radial overlap between the friction surfaces. The axes of the friction surface elements are preferably in alignment. The slope angle of the internal-cone friction surface and that of the external-cone friction surface preferably correspond at least approximately. The smaller the slope angle of the cones relative to the cone axes, the smaller the expenditure of axial force required to achieve a predetermined surface pressure at the friction surfaces. Accordingly, a higher torque can be transmitted with a relatively small contact force in comparison with a multi-surface friction couplings, and this ultimately has a positive effect on the necessary overall volume of the coupling.

This principle can be exploited to particular advantage if two such conical friction surface pairs are used. The friction surface pairs can then be arranged in such a way that friction surface elements can support each other.

It would also be conceivable to use more than two conical friction surface pairs in a coupling arrangement. These can be arranged in axial alignment with one another.

In a particularly preferred embodiment of the invention, two conical friction surface pairs form a frictional connection when the coupling is in the non-actuated condition. This means that the coupling is engaged when not actuated.

It is moreover advantageous if a frictional connection between the two conical friction surface pairs can be released through actuation by a force from one side. This can be achieved, for example, by arranging the conical friction surface pairs with their cone axes in axial alignment. This makes it possible for friction surface pairs to spread out against one another. As a result, actuation of the coupling from one side can be sufficient to bring both friction surface pairs into frictional connection and to release them from one another.

In this connection, it is furthermore preferred if the two conical friction surface pairs are arranged adjacent to one another on an axis in such a way that the cone surfaces of each friction surface pair slope outwards.

Particularly where elements which bear the internal-cone friction surfaces of the friction surface pairs are coupled to one another and, furthermore, the cone surfaces slope outwards relative to the cone axis, it is possible for elements which bear the external-cone surfaces and are arranged concentrically in the internal-cone friction surface elements to be supported on the internal-cone friction surface elements. In this case, the coupling can be as it were of "force-neutral" design with regard to "operating forces" to the outside. Accordingly, it is not necessary, in the engaged condition for example, for additional elements on an assembly axis to absorb axial abutment forces in order to maintain the contact force of the friction surfaces.

It is furthermore particularly advantageous if internal-cone friction surface elements are mounted axially in such a way that they can be moved along an axis of symmetry of the cone. This allows the internal-cone friction surface elements to position themselves automatically through axial movement relative to external-cone friction surface elements.

Preferably, at least one external-cone friction surface element is likewise mounted in such a way that it can be moved axially along an axis of symmetry of the cone. However, it is preferred if another external-cone friction surface element is fixed axially, at least on one side. This enables the coupling to be engaged (non-actuated condition) and disengaged (actuated condition) by moving the axially movable external-cone friction surface element.

In another preferred embodiment of the invention, the external-cone friction surface elements are pushed apart by spreader means. In this arrangement, when the external-cone friction surface elements come to rest against the respective internal-cone friction surface element owing to the spreading motion, the coupling is frictionally connected.

To bring about the spreading motion, it is advantageous if a prestressed spring is arranged between the external-cone friction surface elements of two adjacent friction surface pairs.

To release the frictional connection between two adjacent friction surface pairs, it is furthermore proposed that the friction surface pairs, of which there are at least two, can be disengaged by means of an actuating device, e.g. a pressure piston. For example, the pressure piston presses on the axially movable external-cone friction surface element against the force of a spreading spring, with the result that, with the second external-cone friction surface element fixed, the axial distance between the two external-cone friction surface elements is reduced and the frictional connection with the internal-cone friction surface elements is thus released.

In order to be able to separate the friction surface pairs from one another in a defined manner, it is furthermore proposed, in the case where an inner external-cone friction surface element is capable of axial movement, that a stop for the axially movable inner external-cone friction surface element be formed between mutually coupled internal-cone friction surface elements of the two friction surface pairs.

If the distance between the inner external-cone friction surface elements is reduced by axial movement of the axially movable external-cone friction surface element, this external-cone friction surface element may strike the stop on the coupled internal-cone friction surface elements and move the coupled internal-cone friction surface elements axially, resulting in the separation from one another also of the friction surface pair in which an external-cone friction surface element is fixed axially at least on one side.

As mentioned above, it is possible to set the surface pressure of the friction surfaces by means of the slope of the cone surfaces relative to the axis of symmetry of the respective cones while maintaining a constant axial coupling force. The slope of the conical friction surfaces should preferably be in a range of from about 5° to 10°.

To protect the friction surfaces, it is furthermore preferred that the friction surface pairs be mounted in a coupling housing that is attached to a shaft via which torque transmission is to take place. Toothing is preferably used to mount the internal-cone friction surface elements in a housing of this kind in such a way that they can be moved axially. Spiral toothing is used, for example.

The internal-cone friction surface elements are furthermore preferably designed as annuluses, in which the external-cone friction surface elements lie, the latter likewise being annular. The friction surface elements may also be composed of ring segments.

BRIEF DESCRIPTION OF THE DRAWING

Further advantages and features of the invention will be explained with reference to the single FIGURE according to the invention.

FIG. 1 shows a schematic view of a double-cone friction coupling with an input and output side.

DETAILED DESCRIPTION OF THE INVENTION

FIG. 1 shows a double-cone friction coupling 1 with an input side 2 and an output side 3 in a schematic sectional view. On the input side 2 there is an input shaft 4, on which a dish-shaped coupling housing 4a is formed. Internal-cone elements 6 and 7 are arranged on the inside of a cylindrical shell of the coupling housing 4a. Radial twisting of the internal-cone elements 6 and 7 is prevented by toothing 8 between the coupling housing 4a and the internal-cone elements 6, 7. The toothing 8 is aligned axially, allowing the internal-cone elements 6, 7 to be moved axially relative to the coupling housing 4a as hitherto.

The internal-cone elements 6 and 7 form a unit. A stop ring 9 is provided between the internal-cone elements. Extending into the coupling housing 4a is an output shaft, on which are arranged external-cone elements 11 and 12 in such a way that they cannot rotate relative to the output shaft in an azimuthal direction. The external-cone elements 11 and 12 lie within the internal-cone elements 6 and 7 in such a way that the internal-cone friction surfaces 6a, 7a and external-cone friction surface elements 11a, 12a overlap.

External-cone element 12 can be moved axially, while axial movement of external-cone element 11 is blocked on one side by a stop element 13 on the output shaft 5.

It is possible for the cone element arrangement to be acted upon by a pressure cylinder 14 actuated, for example, by means of compressed air. This is mounted in a housing 5a, which is not connected to the output shaft 5.

The external-cone elements 11, 12 are pushed apart by spring assemblies 15, causing their external-cone friction surfaces 11a, 12a to enter into a frictional connection with the internal-cone friction surfaces 6a, 7a of the internal-cone elements 6, 7. A high surface pressure between the friction surfaces 6a, 12a and 7a, 12a respectively can be produced by means of the spring assemblies 15 if the angle of inclination of the conical friction surfaces is comparatively shallow. In this condition, the coupling is engaged and a torque can be transmitted from the input side 2 to the output side 3. In this process, the capacity of the connected internal-cone elements 6, 7 for axial movement allows their internal-cone friction surfaces 6a, 7a to adapt their axial position to the external-cone friction surfaces 11a, 12a of the external-cone elements 11, 12.

To disengage the coupling, the pressure cylinder 14 is actuated, pushing the external-cone element 12 in the direction of the other external-cone element 11 and compressing the spring assemblies 15 in the process. As a result, the friction surfaces 6a and 12a are disengaged first of all. As soon as the external-cone element 12 strikes the stop ring 9 during the axial movement, the internal-cone elements 6, 7 are moved in the direction of the output side 2, causing the friction surfaces 7a and 11a, too, to disengage from one another in a defined manner. In this actuated condition, the coupling is turned off and no torque is transmitted from the input side 2 to the output side 3.

As soon as a contact force exerted on the external-cone element 12 by the pressure cylinder 14 is removed, the spring assemblies 15 push the external-cone elements 11 and 12 apart to such an extent that the friction surfaces 6a, 12a and 7a, 11a come into frictional connection. The coupling is engaged.

We claim:

1. A friction coupling in which at least two friction surfaces are brought into frictional connection, comprising: a coupling housing and two conical friction surface pairs, one pair including internal-cone friction surface elements that are mounted in an axially moveable manner and are coupled to one another, the other pair including external-cone friction surface elements, and a stop for at least one of the external-cone friction surface elements formed on the coupled pair of internal-cone friction surface elements, wherein the pair including the internal-cone friction surface elements is arranged inside of the coupling housing and contact points between the coupling housing and the internal-cone friction elements prevent radial twisting of the internal-cone friction surface elements, and wherein the external-cone friction surface elements are formed on surfaces of external-cone friction elements that are positioned adjacent to each other and a pre-stressed spring is arranged between the external-cone friction elements and pushes the external-cone friction elements apart to force the external-cone friction surface elements into contact with the internal-cone friction surface elements.

2. The coupling as claimed in claim 1, wherein the two conical friction surface pairs form a frictional connection when the coupling is in a non-actuated condition.

3. The coupling as claimed in claim 1, wherein a frictional connection between the two conical friction surface pairs is released through actuation by a force from one side.

4. The coupling as claimed in claim 1, wherein one friction surface is formed on the internal-cone friction surface element and another friction surface is formed on the external-cone friction surface element, and the external-cone friction surface element is positioned within the internal-cone friction surface element.

5. The coupling as claimed in claim 1, wherein the conical friction surface pairs are arranged with their cone axes in axial alignment.

6. The coupling as claimed in claim 1, wherein the two conical friction surface pairs are arranged adjacent to one another on an axis such that the cone surfaces of each friction surface pair slope outwards relative to the axis.

7. The coupling as claimed in claim 1, wherein an external-cone friction surface element is mounted such that it is axially moveable along an axis of symmetry of the cone.

8. The coupling as claimed in claim 1, wherein the two friction surface pairs are disengaged by an actuating device.

9. The coupling as claimed in claim 1, wherein the friction surface pairs are mounted in the coupling housing.

10. The coupling as claimed in claim 1, further comprising a toothing mechanism that allows the internal-cone friction surface elements to move axially.

11. The coupling as claimed in claim 1, wherein the stop for at least one external-cone friction surface element is formed between the coupled internal-cone friction surface elements of two friction surface pairs.

12. The coupling as claimed in claim 1, wherein the slope of the friction surfaces relative to a cone axis is in a range of from 5° to 10°.

* * * * *